US012262173B2

(12) United States Patent
Zamora Esquivel et al.

(10) Patent No.: US 12,262,173 B2
(45) Date of Patent: Mar. 25, 2025

(54) AUDIO PROCESSING DEVICE AND METHOD FOR ACOUSTIC ANGLE OF ARRIVAL DETECTION USING AUDIO SIGNALS OF A VIRTUAL ROTATING MICROPHONE

(71) Applicant: Intel Corporation, Santa Clara, CA (US)

(72) Inventors: Julio Cesar Zamora Esquivel, Sacramento, CA (US); Hector Cordourier Maruri, Guadalajara (MX); Jose Rodrigo Camacho Perez, Guadalajara (MX); Paulo Lopez Meyer, Zapopan (MX); Jose Torres Ortega, Zapopan (MX); Alejandro Ibarra Von Borstel, Manchaca, TX (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 17/509,573

(22) Filed: Oct. 25, 2021

(65) Prior Publication Data

US 2022/0046355 A1 Feb. 10, 2022

(51) Int. Cl.
*H04R 1/40* (2006.01)
*H04R 3/00* (2006.01)

(52) U.S. Cl.
CPC .................................... *H04R 1/406* (2013.01)

(58) Field of Classification Search
CPC .......... H04R 1/406; H04R 3/005; H04R 5/00; H04R 2201/401; H04R 2430/21; H04R 2430/20; G01S 5/20; G01S 3/8034; G11B 20/00; H04M 1/00
See application file for complete search history.

(56) References Cited

U.S. PATENT DOCUMENTS 9,554,203 B1 * 1/2017 Pavlidi ..................... H04R 1/08
2004/0120532 A1 * 6/2004 Dedieu .................. H04R 1/406 381/91
2009/0111507 A1 * 4/2009 Chen ................... H04M 1/6008 381/92
2012/0128160 A1 5/2012 Kim et al.
2012/0308040 A1 12/2012 Thormundsson et al.
2019/0219660 A1 * 7/2019 Cordourier Maruri ...................... G01S 3/8034
2019/0355373 A1 * 11/2019 Nesta ..................... G10L 21/028
2020/0213728 A1 * 7/2020 Lopatka ................ G01S 3/8083

FOREIGN PATENT DOCUMENTS

KR 10-2013-0116271 10/2013

OTHER PUBLICATIONS

"USB Audio Streaming: UMA-8 USB mic array—V2.0" , https://www.minidsp.com/products/usb-audio-interface/uma-8-microphone-array, 2021.

(Continued)

*Primary Examiner* — Yogeshkumar Patel
(74) *Attorney, Agent, or Firm* — Akona IP PC

(57) ABSTRACT

An audio processing device and method uses audio signals from a virtual rotating microphone for acoustic angle of arrival detection using a doppler effect technique.

25 Claims, 11 Drawing Sheets

(56) References Cited

OTHER PUBLICATIONS

Fonseca, et al., "On the Design of a Compact Neural Network-Based DOA Estimation System", IEEE Transactions on Antennas and Propagation; vol. 58, No. 2; pp. 357-366; 2010.
Hioka, Y., et al., "Direction of Arrival Estimation Using A Circularly Moving Microphone" , International Workshop on Acoustic Signal Enhancement (IWAENC2018), Sep. 2018, Tokyo, Japan, 5 pages.
Lee, R., et al., "Sound Source Localization Based on GCC-PHAT With Diffuseness Mask in Noisy and Reverberant Environments" , IEEE Access, vol. 8, pp. 7373-7382, 2020, doi: 10.1109/ACCESS.2019.2963768.
International Search Report and Written Opinion for PCT Patent Application No. PCT/US2022/036933, dated Nov. 3, 2022.

* cited by examiner

FIG. 1A

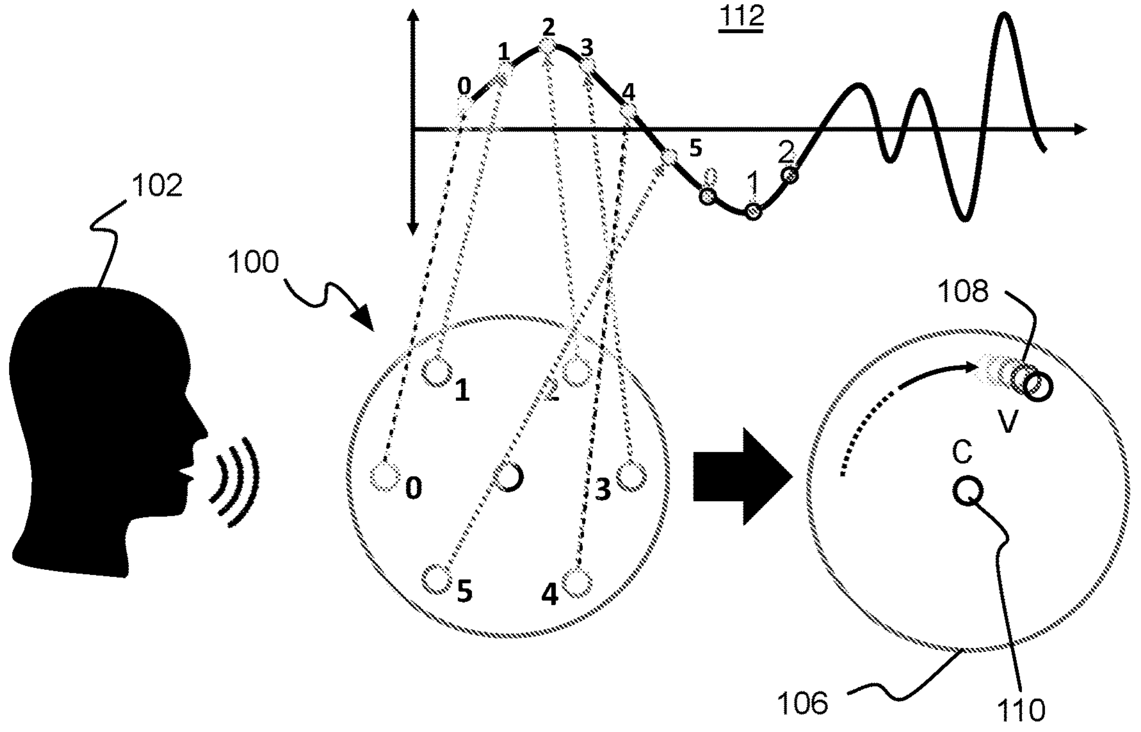

FIG. 2 200

RECEIVE AUDIO SIGNALS FROM A FIXED CIRCULAR ARRAY OF MICROPHONES AND BASED ON AUDIO RECEIVED BY THE CIRCULAR ARRAY 202

↓

DETERMINE AN ACOUSTIC ANGLE OF ARRIVAL OF AUDIO RELATIVE TO THE CIRCULAR ARRAY COMPRISING GENERATING AT LEAST TWO FREQUENCY-RELATED VALUES EACH ASSOCIATED WITH MICROPHONES ON AN OPPOSITE SIDE OF A POTENTIAL ANGLE OF ARRIVAL DIRECTION, AND COMPARING THE FREQUENCY RELATED VALUES 204

↓

WHEREIN THE GENERATING COMPRISES USING SIGNS OF THE AUDIO SIGNALS WITHOUT USING MAGNITUDES OF THE AUDIO SIGNALS IN COMPUTATIONS TO GENERATE AND COMPARE THE FREQUENCY-RELATED VALUES 206

700

800

900

1000

1100

AUDIO PROCESSING DEVICE AND METHOD FOR ACOUSTIC ANGLE OF ARRIVAL DETECTION USING AUDIO SIGNALS OF A VIRTUAL ROTATING MICROPHONE

BACKGROUND

A number of audio computer applications analyze a human voice such as automatic speech recognition (ASR) that identifies the words being spoken or speaker recognition (SR) that can identify which person is speaking. Some audio applications can analyze other targeted sounds. For these audio applications, it is often desirable to know the location of an acoustic source relative to an audio receiving device that has an array of microphones for example. This acoustic source detection, also referred to as acoustic angle of arrival (AoA) detection, may assist communication devices, such as on a smartphone or smart speaker for example, to differentiate an intended user from other acoustic sources of interference in the background or some additional source that can be used for context awareness, where an acoustic source might be identified and an acoustic receiver may be able to determine the environment of the acoustics being received. Also, such AoA detection may enable the use of different types of audio enhancement techniques such as beamforming on certain audio devices to assist with collision avoidance, interactive presentations, and noise reduction to name a few examples.

A number of these applications use a circular array of microphones to detect an acoustic angle of arrival, where the more microphones, the more accurate the angle estimation which costs more in materials and requires a larger circuit area to operate. Also, such conventional circular microphone arrays require large computational loads to perform the angle detection, whether by time difference of arrival computations or other techniques. The larger computational load consumes too much power and memory capacity, especially on small, mobile, low resource devices, such as smartphones.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1A is a schematic diagram to explain a virtual rotating microphone audio signal according to at least one of the implementations described herein;

FIG. 2 is a flow chart of an example method of acoustic angle of arrival detection according to at least one of the implementations described herein;

DETAILED DESCRIPTION

Figure 1:
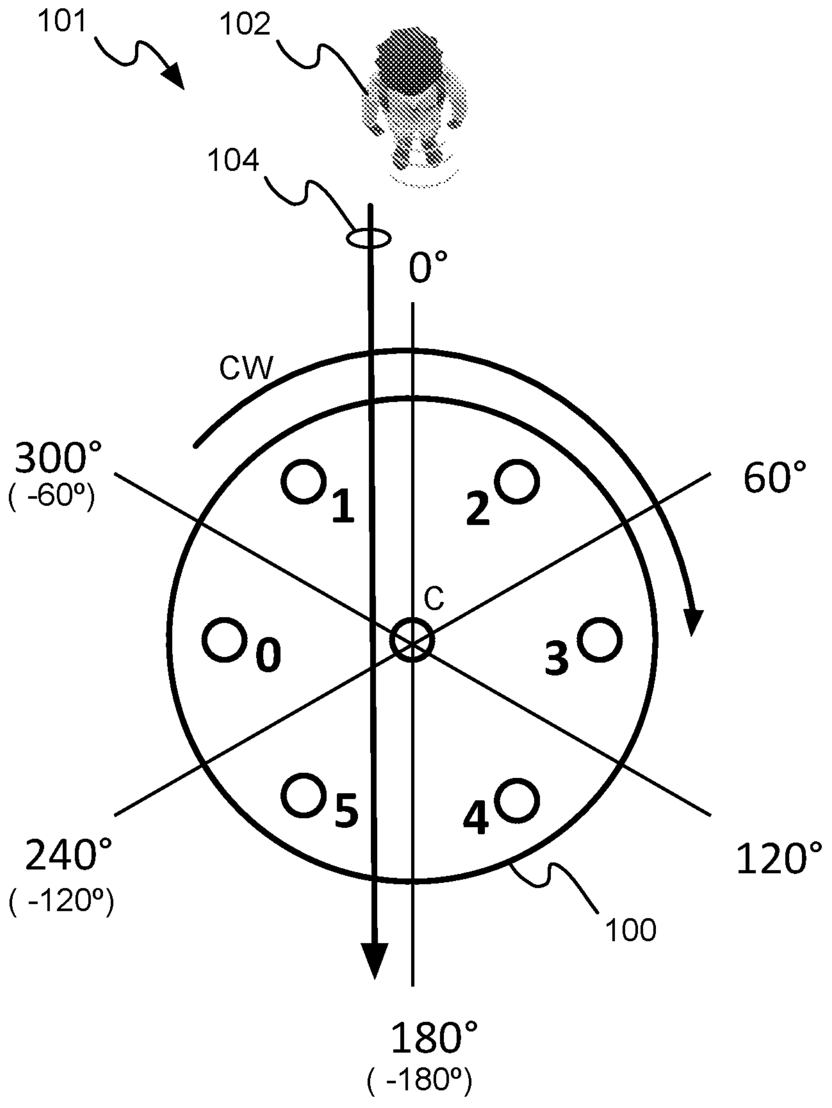
FIG. 1 is a schematic diagram of a circular microphone array according to at least one of the implementations described herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless the context mentions specific structure. For instance, various architectures employing, for example, multiple integrated circuit (IC) chips and/or packages, and/or various computing devices and/or consumer electronic (CE) devices such as laptop or desktop computers, tablets, mobile devices such as smart phones or smart speakers, video game panels or consoles, high definition audio systems, surround sound or neural surround home theatres, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Audio processing systems, articles, devices, and methods for acoustic angle of arrival detection using audio signals of a virtual rotating microphone are described herein.

As mentioned, the detection of an angle of arrival (AoA) of sound waves received at a microphone can be used to infer whether or not the sound (or acoustic waves) originate from an intended user, some other source of interference, or from some additional source that can be used for context awareness. It also enables the use of different types of audio enhancement techniques on the selected audio source such as beamforming. Once the angle of arrival is known, audio signal components of an antenna array can be combined to adjust constructive and/or destructive interference so that sound waves along the AoA can be amplified and applications may transmit data in the direction of the angle of arrival.

Generally, the known AoA detection techniques benefit from a relatively large number of microphones (or channels) in a microphone array to provide a sufficient amount of audio data that indicates an AoA, such as five to seven microphones in an array. The AoA can be obtained with arrays of fewer microphones on conventional systems, but correct angle detection may not be as precise.

One known technique for detecting the AoA of a sound source involves collecting audio signal data from microphone arrays and performing fast Fourier-transform (FFT)-based cross correlation, such as generalized cross-correlation with phase transform (GCC-PHAT), which is able to detect a time difference of arrival (TDOA) of each audio signal among all the different signals from each microphone. Converting the input audio into the frequency domain requires some computer overhead, and is usually performed by dedicated digital signal processors (DSPs) that can consume a large amount of power and add weight on small devices. It also typically requires enough microphones to be precise that adds to the footprint requirements for the AoA detection, and requires a relatively large amount of samples, typically from all microphones on the array at all sample time frame windows, thereby adding further to the computational load for the AoA detection Another known AoA detection technique uses relative signal amplitudes (or magnitudes) that indicate the loudness of the acoustics. Specifically, this technique relies on the use of the relative amplitude of the signal in each microphone of a microphone array by identifying the direction of the highest amplitude to determine the angle of arrival of audio. This relative signal-amplitudes technique provides quick responses, but cannot deliver precise results. It is usually employed for "quadrant" detection, i.e., 90 degree resolution for four possible general directions. This type of technique also requires precise pre-calibration that factors the physical differences from one microphone to another microphone because microphones could have different gains (or loudness) which affects the amplitudes so that the direction may be inaccurate.

One known variation of the relative signal amplitudes technique uses a feedforward neural network such as a multi-layer perceptron (MLP) network, and is trained on three beam functions in an antenna array to capture the amplitudes which are used as features (or input) to train a neural network. This operates mainly on electromagnetic waves rather than sound waves. See, N. Fonseca et al., "On the design of a compact neural network-based DOA estimation system," IEEE Trans. Antennas Propag., vol. 58, no. 2, pp. 357-366 (2010). This technique, however, also has a heavy computational load, which requires dedicated fixed function hardware circuitry in order to produce a real-time output of the difference of the antennas' input signal in certain fixed delay-and-sum beams, also resulting in a relatively large amount of power consumption.

In another conventional alternative, sound sources can be detected with the use of an additional sensor, such as a camera, IR sensor, and so forth that provides an image-based indication of the location of the source, which adds substantial extra hardware costs. Moreover, this technique requires a relatively large amount of operations and computational load to detect objects in images, such as a face, in addition to the added camera hardware, resulting in a large amount of power consumption.

To resolve these issues, the method and system described herein provides an efficient angle of arrival detection technique by generating an audio signal of a virtual rotating microphone and that uses sign-based frequency counting algorithms to determine the acoustic angle of arrival. Specifically, a fixed circular microphone array samples incoming audio signals sequentially, such as in a rotating clockwise order, and with the static microphones in the array. An audio signal is synthesized according to the sequence of samples and that emulates the signal of a mechanically rotating microphone since taking samples sequentially at locations of a moving or rotating microphone except with an array of fixed microphones, the resulting audio signal characteristics (such as amplitudes (or magnitudes) and frequencies) may be the same or very similar. This synthetic audio signal can be used to establish a virtual doppler effect that can indicate the location of a sound source in a 360° environment.

Particularly, the doppler effect here refers to varying of frequency in an audio signal as the distance changes between a microphone and an audio source. Here, the situation is analogous to a fixed audio source and a moving microphone. As the microphone moves closer to the source, the frequencies of the audio signal generated by the moving or rotating microphone will increase, while the frequencies will decrease as the microphone moves farther from the audio source.

Referring to FIG. 1, a circular array 100 of microphones 0 to 5 mounted on a circuit board is shown in a setup 101 in front of a person that is an audio source 102. The circular array 100 has samples obtained sequentially here in a clockwise manner according to arrow CW. The circular array 100 is divided by fixed possible AoA angle lines (or potential directions) labeled 0 to 360 degrees (or 0 to 180 and −180 degrees). In this example, where the audio source 102 is positioned between microphones 1 and 2 at the 0 degree position around the circular array 100, the angle of arrival is considered to be diametric through the center, or central microphone C, on the circular array 100. A central microphone in the center of the array may provide reference audio signal samples as described below.

Referring to FIG. 1A, a synthetic audio signal 112 is generated by taking samples from the microphones 0 to 5 on the circular array 100, and placing or using those samples in chronological order as shown on virtual signal 112, and as if the samples were obtained from a single audio signal of a virtual rotating microphone V 108 on a rotating platform 106. This could be inverted to go counter-clockwise instead.

In the present example, the angle of arrival (AoA) is indicated by the direction in which the arrow head is pointed (here being 180 or −180 degrees) as shown by AoA arrow 104 on FIG. 1 (which is offset from the diametric line simply for explanatory purposes only). With this arrangement, and while the samples are collected in a clockwise order, the frequencies of the samples of microphones 5, 0, and 1 will increase since their positions become closer to the audio source 102 from microphone 5 to 1 when samples are collected in a clockwise manner, while the frequencies of microphones 2, 3, and 4 decrease as the microphones are positioned farther from the audio source 102 and from microphone 2 to 4. Considering this is a continuous process where the frequencies of microphones 1 and 2 in this example should be similar, then when the samples are captured in a clockwise manner, and when considerations are implemented to factor noise, this has been found to result in the total frequency of a semicircle of the microphones on a right (or approaching) side of the AoA (when facing in the direction of the AoA, here toward 180 degrees or downward on the page) to almost always be larger than the total frequency of a semicircle of the microphones on a left (or moving away or diverging) side of the AoA.

Singular samples, such as a sample from microphone 1 having a larger frequency than microphone 5 and so forth for the other microphones, cannot be relied upon alone because noise has too much of an effect on the frequency levels. Thus, by one form, the difference in total frequency for microphones on opposite sides of each or individual potential direction (or direction line) can be compared. It has been found that the largest difference in semicircle (or side) frequency total usually indicates the AoA. By an alternative form, the difference is a maximum total difference in frequency between the samples of the center microphone and the samples of the microphones in one of the semicircles.

With this semicircle doppler effect arrangement, it has been found that the doppler effect remains dominant, or at least detectable, and can be used to determine the angle of arrival (AoA) because of the constant changing positions of the microphones over time and the speed of the sampling (sample rate) that is lower than the speed of sound. To make the effect more noticeable, the sample should still be comparable (within the same order of magnitude) to the speed of sound. By one form, limits of the sampling rate is set according to the Nyquist-Shannon sampling theorem so that no or very little information is lost.

Also with this doppler effect arrangement, the AoA is computed by measuring a difference (or delta) in total sound frequencies of the microphones for each possible discrete circular orientation, and with respect to the center microphone when used, and without the use of any multiplication operations. To accomplish this, the system uses sign changes to detect zero-crossings, and in turn half cycles to count frequencies of the virtual signal with respect to the central microphone.

The result is a very efficient AoA detection method and system that consumes very low amounts of power without the computational cost of a Fourier transform pipeline or other relatively expensive correlation computation. Moreover, no multiplication operations or bit shifts are needed. Also, the disclosed method can reduce the sampling rate six (or number of microphones) times in a sequence mode that takes one sample per frame time window instead of synchronized techniques that require samples from all microphones for each time frame window, thereby reducing power consumption even more. The disclosed method allows for an emulated high-speed rotation microphone without the use of any mechanical devices, e.g. motor, wiring handling, etc., and this also eliminates any background noise that can occur from the rotation of the microphones in air, allowing high RPS without any added background noise.

The present method and system reduce the computational load so that dedicated hardware such as DSP acceleration can be avoided. Also, the presently disclosed method provides high performance since this method is able to detect the AoA with high precision depending on the number of microphones in the circular array, and without a tradeoff of power consumption. The present method also can be deployed in just about any existing microphone array without the need for additional sensors or processor hardware. Also, since the present method and system can operate largely without special pre-processing or tuning of the audio signals, the present method is not affected by an acoustic environment in which each microphone has a slightly different gain, and high performance angle detection can be obtained in acoustic environments with rooms of vastly different sizes and shapes.

Referring to FIG. 2, an example process 200 for a computer-implemented method of acoustic angle of arrival detection is provided, and specifically involving the use of a doppler effect to determine the AoA with a virtual rotating microphone. In the illustrated implementation, process 200 may include one or more operations, functions or actions as illustrated by one or more of operations 202 to 206 numbered evenly. By way of non-limiting example, process 200 may be described herein with reference to example circular arrays 100 or 600, and/or acoustic signal processing system or device 1200 described herein with FIG. 1, 1A, 6, or 12, and where relevant.

Process 200 may include "receive audio signals from a fixed circular array of microphones and based on audio received by the circular array" 202. Thus, as described above, a microphone array may provide a number of fixed microphones and corresponding number of channels, where each microphone converts received audio in the form of acoustic waves into an audio signal. This operation also may involve pre-processing the audio signals sufficiently for acoustic angle of arrival detection, such as ADC when needed.

This operation also may involve sequentially obtaining samples from the microphones to use the doppler effect. Samples are obtained in a clockwise or counter-clockwise manner around the microphones of the circular array, and from one microphone at each sample time frame window in order to imitate sampling obtained from a single rotating microphone. The diameter lines between the microphones on the circular array each represent a potential AoA direction or line. The result is that microphones on one side of a diameter (or a semicircle of microphones) of the circular array will have frequencies that become larger as the samples are obtained from microphones that become closer to the audio source. Oppositely, the microphones on the opposite side of the potential AoA direction or line will decrease as the samples are from microphones that diverge or move away from the audio source. Thus, the approaching side will have a total frequency larger than the total frequency of the diverging (or moving away) side due to the doppler effect.

To take advantage of the doppler effect then, process 200 may include "determine an acoustic angle of arrival of the audio relative to the circular array comprising generating at least two frequency-related values each associated with microphones on an opposite side of a potential angle of arrival direction, and comparing the frequency-related values," 204. By one approach, the frequency-related values are each a combination or sum of sample frequencies of samples of microphones on a semicircle or one side of a potential AoA direction.

By an alternative, the frequency-related values are each a total of differences between the frequencies of samples of the semicircle and samples of a center or reference microphone that is amid the circular array. The array or virtual microphone sample and the center microphone sample that are used to determine a single difference are both of the same sample time frame window so that as the array microphones sequentially provide samples, the center microphone may provide a sample from a different time to match the times of the sequential samples. The center microphone acts as a reference so that microphones closer to the audio source than the center microphone will have samples with a larger frequency than that of the center microphone, while microphones farther from the audio source than the center microphone will have a smaller frequency than that of the center microphone. This may be performed because the positioning of the microphones are better factored into the AoA detection by totaling the difference between frequency count samples of the circular array microphone and center microphone rather than merely totaling frequency count at the microphone on the array.

In order to obtain the frequency counts, process 200 may include "wherein the generating comprises using signs of the audio signals without using magnitudes of the audio signals in computations to generate and compare the frequency-related values" 206. Specifically, a change in sign from one sample to another sample indicates a zero-crossing on a time-domain graph of the audio signal, which in turn indicates half-cycles of the audio signal, or in other words, the frequency of the audio signal during a sample. Thus, whether the sign of the audio signal is indicated in the samples by most significant bit (or sign-magnitude format) or some other format, simply determining the sign of the audio signal is an enormous reduction in computational load versus performing computations in the frequency domain and/or using the magnitudes of the samples in computations with multiplication and/or bit shift operations, for example.

Once the method generates the frequency-related values of both of the opposite sides of each potential AoA direction, the two frequency-related values on the opposite sides of the same potential AoA direction are differenced, such as by subtraction. This is repeated for each available potential AoA direction. However, at this point, this merely refers to the general direction of the diametric lines, and not yet the specific end direction, or in other words, which end of the line has the arrow head. Thus, one set of two opposite or semicircle frequency-related values is provided for a single potential AoA direction whether the arrow head points left or right, or up or down, or 0 degrees and 180 degrees, and so forth, along the same potential AoA direction line.

Thereafter, the method determines the maximum difference (or delta) of the differences among all sets of two opposing frequency-related values. The single set of two opposite frequency-related values with a maximum difference establishes which potential AoA direction is the correct direction for the AoA. However, the end direction still is not established. As mentioned above, the side with the larger frequency related value indicates the approaching side of the potential AoA direction. When the samples are collected in a clockwise order, the semicircle of the larger frequency-related value is on the right side of the potential AoA direction when facing in the direction of the AoA. The approaching semicircle will be on the left side of the potential AoA direction when samples are collected in a counter-clockwise order.

Figure 3:
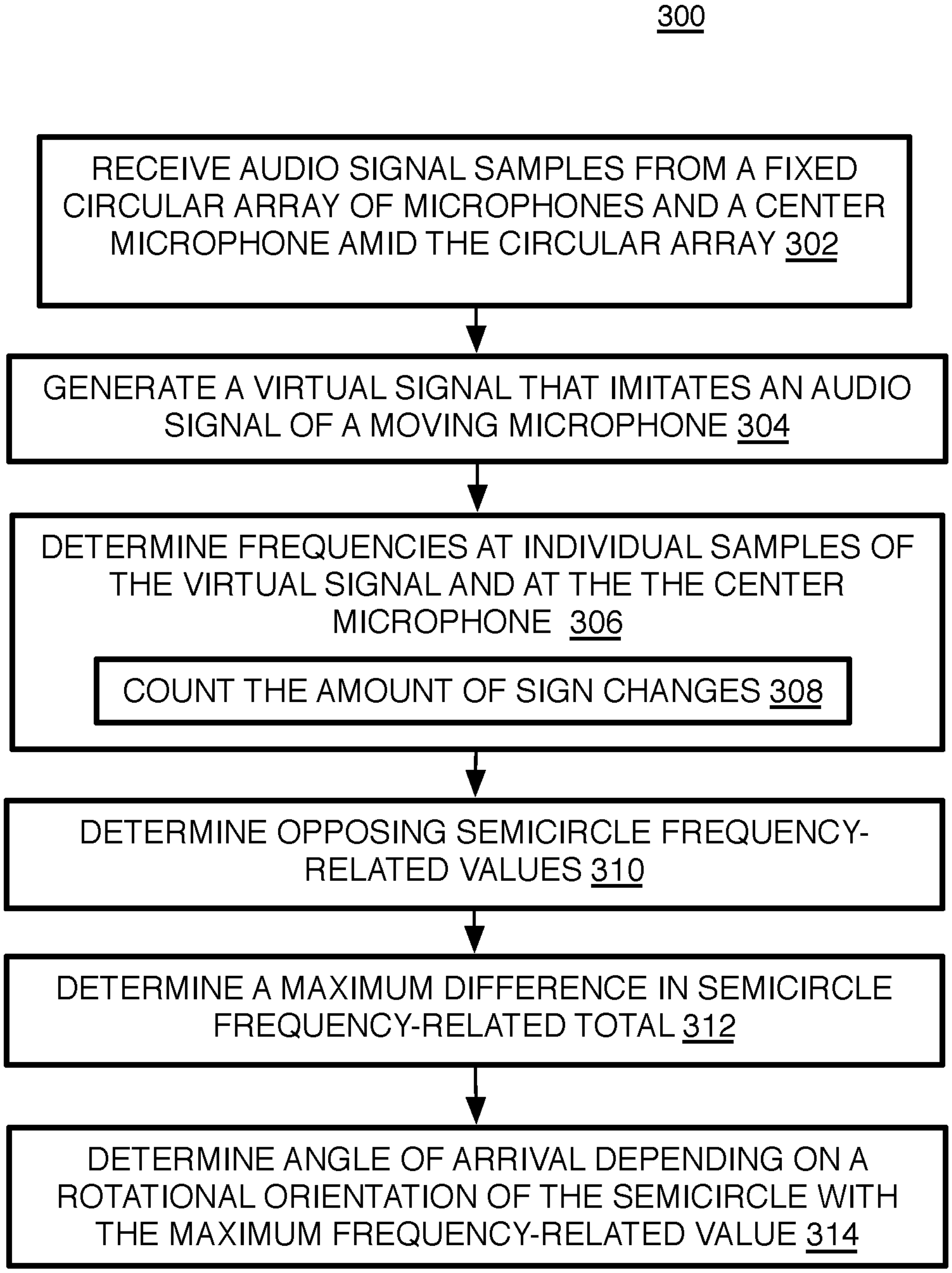
FIG. 3 is a flow chart of a detailed example method of acoustic angle of arrival detection according to at least one of the implementations described herein.

Referring now to FIG. 3, an example process 300 for a computer-implemented method of acoustic angle of arrival detection is provided, and specifically providing the details involving the use of a virtual doppler effect and a virtual rotating microphone to determine the AoA. In the illustrated implementation, process 300 may include one or more operations, functions or actions as illustrated by one or more of operations 302 to 314 numbered evenly. By way of non-limiting example, process 300 may be described herein with reference to example circular arrays 100 or 600, and/or acoustic signal processing system or device 1200 described herein with FIG. 1, 1A, 6, or 12, and where relevant.

Process 300 may include "receive audio signal samples from a fixed circular array of microphones and a center microphone amid the circular array" 302. The circular array may have any architecture that can provide the audio samples as described herein. By one example, a UMA-8 microphone array may be used with six microphones with a separation of 60° between them to form a full circle as described with circular array 100 (FIG. 1). The number of microphones sets the resolution of the AoA, and in this example for six microphones, an AoA is determined in a direction covering a ±30° sector.

As alternative arrangements, less than all microphones could be used, such as in one example where at least two microphones may form the semicircle of microphones on each side of a potential AoA direction when the circular array may have many more microphones that could be used, and in order to further reduce computational load. By yet other alternatives, it will be understood, however, that a diametric potential direction could intersect a microphone on one end of the diameter line, and that intersected microphone may be ignored or the values of that microphone may contribute to both sides of the potential direction. This may occur when an odd number of microphones are present. As another alternative to increase the resolution of the system, the potential AoA directions may intersect two microphones, one at each end of the diametric potential direction in a similar manner. In this case as well, one or both of the intersected microphones may contribute to no side or equally to both sides of the potential direction. The intersected microphones could be ignored when lowering the computational load is the higher priority.

By one form, the microphones collect audio at a sampling frequency of 44.1 kHz while audible audio typically has much lower frequencies and can extend from 0.002 to 20 kHz so that at least each half period or half cycle of the incoming audio will have one sampling if not many more samplings so that frequency counts cannot be missed and can be determined accurately.

The sampling is performed as mentioned in operation 200 (FIG. 2) above to obtain samples of a virtual mechanically rotating microphone by obtaining samples one at a time in sequence at sample time frame windows and around the circular array. It should be noted, however, that the time frame windows can be overlapped. In the present example, a full rotation is taken every six samples with one per microphone, which here results in 1.3 µS each to imitate a virtual rotating microphone at a rate of 7,692 RPS. The collected samples in order around the circular array then fulfills process 300 including "generate a virtual signal that imitates an audio signal of a moving microphone" 304.

Figure 4:
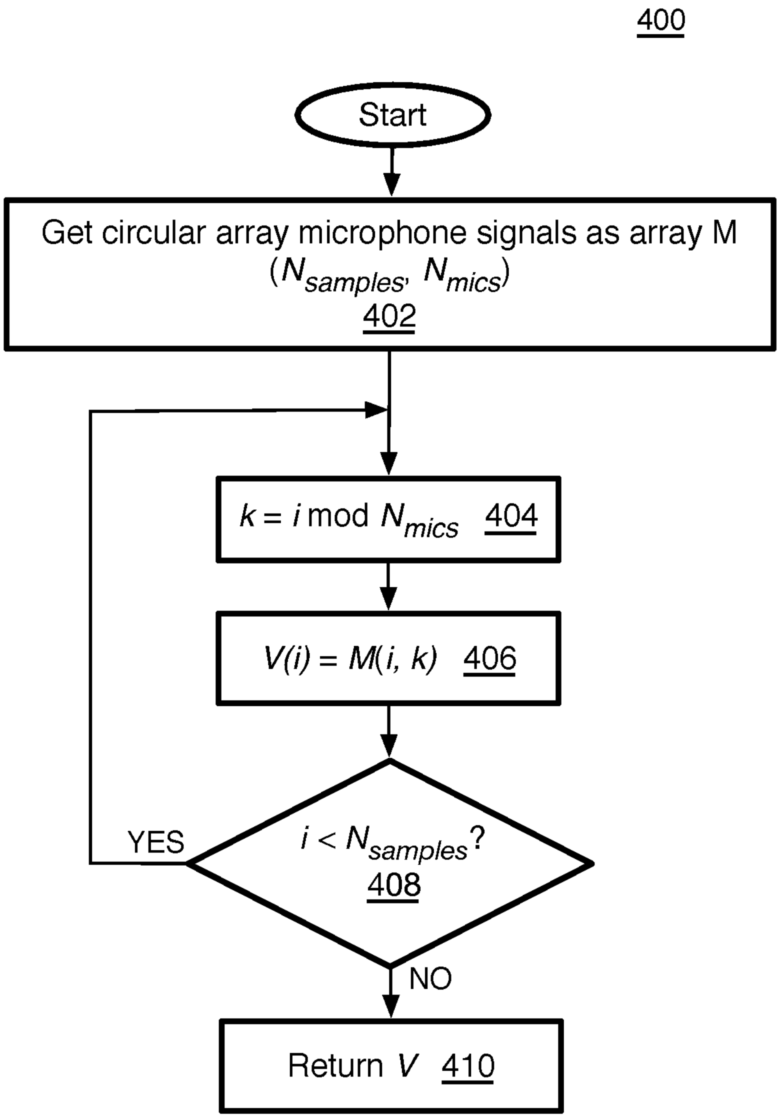
FIG. 4 is a flow chart of a part of an example method of acoustic angle of arrival detection according to at least one of the implementations described herein.

Referring to FIG. 4 for more detail, one example process 400 for generating a virtual signal of a virtual moving microphone is provided, although other ways to determine the virtual signal could be used instead. In this example, process 400 may include designating the samples with an operation to "get circular microphone signals as array M ($N_{samples}$, $N_{mics}$)" 402, and where individual channels each provide an audio signal from one of the microphones. $N_{samples}$ are the number of samples obtained over an entire audio signal and may cover a duration of an audio signal that extends for multiple full rotations of samples from the circular array, and $N_{mics}$ are the number of microphones in the circular array.

Then, process 400 may generate an index of the microphone samples including performing (404) a modulo equation:

$$k = i \bmod N \quad (1)$$

where k is the sample index relative to microphone position on the circular array so that for six microphones in the circular array, k equals 0 to 5 for example. The N is the number of microphones $N_{mics}$ and time (or sample) i is the continuously running sample number or time stamp of the samples for as long as the audio signals are providing the samples. Thus, it can be stated that in the present example of six microphones in the array, the i-th sample will be taken from the microphone with index k=i mod 6.

As mentioned, the AoA can be estimated by relating the audio frequency of the virtual rotating microphone (VRM) to the location of the physical microphones. To qualitatively estimate the audio frequency of the VRM signal or just virtual signal, the sign of each consecutive VRM sample can be accumulated as an estimator of signal frequency. Thus, process 400 may include performing (406):

$$V(i) = M(i, k) \quad (2)$$

where V( ) is the virtual signal that is established by collecting samples i with an index value k from a microphone array M( ). The samples i may be added to memory as part of the virtual signal for example, and sample by sample i until the inquiry "i<$N_{samples}$?" 408 becomes false. This collects samples of one or more rotations of the circular array.

Process 400 then may include "return V" 410 to provide the virtual signal for AoA detection analysis, whether by moving the samples to a different memory, or simply providing a processor access to the samples, and so forth.

Returning to process 300, the method 300 then may include "determine frequencies at individual samples of the virtual signal and at the center microphone" 306, and this may be performed by the operation "count the amount of sign changes" 308. Counting the sign changes to determine the frequency of the audio signal at specific samples substantially decreases the computational load of the AoA in contrast to the conventional use of multiplication and/or bit shifts with the magnitudes of the samples and/or conversion to the frequency domain, for example.

Figure 5:
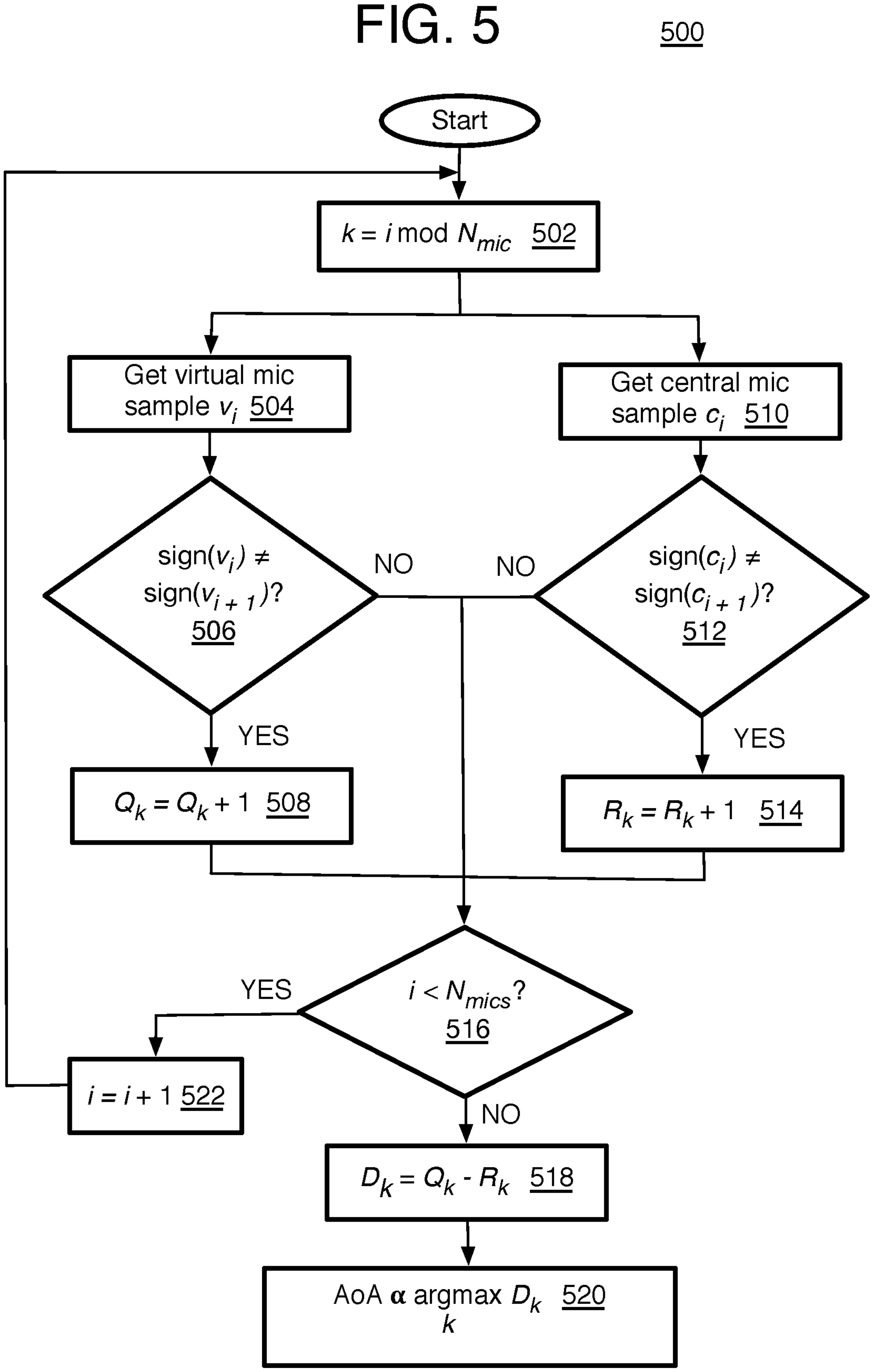
FIG. 5 is a flow chart of another part of an example method of acoustic angle of arrival detection according to at least one of the implementations described herein.

Referring to FIG. 5 for more detail, a specific example process 500 for generating doppler effect frequency counts is provided for the VRM. For this example, a center microphone also provides an audio signal and the method generates a sequence C of reference or center samples $c_i$. Each sample $c_i$ is taken at a time $t_i$. Similarly, the sequence V of samples $v_i$ from the VRM also are each taken at time $t_i$. An illustration of this labeling convention is shown in Table 1 below, which shows a sequence of samples of the central microphone and the VRM as well as the index k of microphone positions.

TABLE 1

| Sampling Index i | 0 | 1 | 2 | 3 | 4 | 5 | 6 | 7 | 8 | 9 |
|---|---|---|---|---|---|---|---|---|---|---|
| Central Mic $c_i$ | $c_0$ | $c_1$ | $c_2$ | $c_3$ | $c_4$ | $c_5$ | $c_6$ | $c_7$ | $c_8$ | $c_9$ |
| Virtual Mic $v_i$ | $v_0$ | $v_1$ | $v_2$ | $v_3$ | $v_4$ | $v_5$ | $v_6$ | $v_7$ | $v_8$ | $v_9$ |
| Mic Index k | 0 | 1 | 2 | 3 | 4 | 5 | 0 | 1 | 2 | 3 |

As described above with process 400, process 500 may include "k=i mod $N_{mics}$" 502 to index the samples. Thereafter, process 500 may include "get virtual mic sample $v_i$" 504 which obtains the sample of the virtual or array microphone at time i in order to determine whether or not a zero crossing occurs between samples $v_i$ and $v_{i+1}$. Thus, process 500 then may include the inquiry "sign($v_i$)≠sign($v_{i+1}$)?" 506. This can be performed in a number of ways.

The sample format that indicates the sign of the sample may be in most significant bit (sign-magnitude) form, one's complement, two's complement, offset binary, or another format where either simply examining the sample value or performing a simple subtraction, with zero for example, will indicate the sign of the sample. By one form, this is performed without any multiplication or bit shift operation with the magnitude of the sample, thereby avoiding large computational costs, costs in bitrate, and power consumption.

For the VRM signal, if the signs of two consecutive samples are different, a VRM (or virtual or array) frequency counter $Q_k$ is increased to accumulate the number of zero crossings or roots corresponding to the k-th microphone in the circular array. Thus, process 500 may include performing (508):

$$Q_k = Q_k + 1 \quad (3)$$

Also, process 500 may include "get central mic sample $c_i$" 510 to obtain the center microphone sample at time i. Similar to the virtual operation, when a center microphone is being used, process 500 may include the inquiry "sign $(c_i) \neq \text{sign}(c_{i+1})$?" 512, and when two consecutive samples of the center microphone have different signs, a reference counter $R_k$ is increased to accumulate the number of center zero-crossing or roots in the sample according to operation (514):

$$R_k = R_k + 1 \tag{4}$$

The result is a frequency count for each virtual signal sample or microphone position k for the microphones on the circular array, as well as for each center microphone sample. This way, an estimate of high or low audio frequencies per microphone location is obtained in the circular array.

When either the virtual sample $v_i$ or center sample $c_i$ does not indicate a zero crossing, the process skips the incrementing of the counter, and the process loops to the next samples at the next time frame i. Thus, whether or not the counters are implemented, process 500 then may include the inquiry "$i < N_{mics}$?" 516, and if so, the process loops to operation 522 to increment time frame i up by one and back to operation 502 to perform the process 500 again on the next samples.

Otherwise, when the number of microphones of one complete rotation on the circular array is reached, and when the frequency-related values use the differences between virtual and center frequency counts, process 500 then computes a difference in frequency or $D_k$ per microphone location with respect to the central microphone that can be computed as:

$$D_k = Q_k - R_k \tag{5}$$

This operation, however, can be skipped when the samples of the center microphone are not being used and the frequency counts $Q_k$ of each virtual or array microphone of the circular array are being used directly as described below.

Process 500 then represents the next operation of the AoA determination by including (520):

$$AoA\alpha \operatorname*{argmax}_k D_k \tag{6}$$

Here, the AoA corresponds to the direction of the k-th microphone direction relative to the maximum $D_k$. In other words, this represents the AoA direction by indicating the microphone closest to the audio source on the approach side of the AoA direction. The AoA $\alpha$ is simply the AoA direction.

Returning to process 300 to break down equation (6) into three parts, first, process 300 may include "determine opposing semicircle frequency-related values" 310. This may refer to totaling the differences in virtual and center samples for each semicircle (or side of a potential AoA direction). This can be performed in a number of different ways. By one approach, the differences $D_k$ are summed for the microphones on one side of each of the diametric potential AoA directions where the sum or total is referred to as a frequency-related value. Thus, for the circular array of six microphones, this sum is obtained for every three consecutive microphones resulting in six sums for three diametric potential AoA directions covered by three sets of two opposing semicircles. Also as mentioned in the alternative, the frequency-related value each could be the sum of the frequency counts $Q_k$ of each three consecutive virtual microphones when the center count $R_k$ is not being used to form the three sets of opposing semicircle frequency-related values.

Then, process 300 may include "determine a maximum difference in semicircle frequency-related total" 312. For this operation, each two opposing frequency-related values representing semicircles of microphones on the opposite sides of a same potential AoA direction are differenced or subtracted form each other to determine a difference referred to as a delta. When six microphones are being used, three deltas are computed. For example, this could include one difference (or delta) for the potential AoA direction for 0 or 180 degrees, another delta for a second potential AoA direction for −60 or 120 degrees, and a third delta for a third potential AoA direction for 60 or −120 degrees. It will be understood that operations 310 and 312 could be combined into a single equation by summing all of the microphone differences $D_k$ or virtual frequency counts $Q_k$ to form the frequency-related value for each opposing semicircle, and then subtracting the two opposing frequency-related values from each other.

By one form, a robustness threshold is applied where at least one of the differences in opposing frequency-related values (or deltas) must be over a threshold, such as 100, for any AoA to be output for a single full cycle. This threshold is provided because the audio coming from any direction can cause the counters to increase (based on the zero crossing signals), but only the audio coming from the angle in the middle of the semicircles will produce a significant difference in the counters for each side. Thus, the threshold limits the system to only permit an AoA output when it is clear the delta difference between the two semicircles is at least larger than the threshold. The threshold may be determined by experimentation, but can be adjusted based on the sample frequency and size of the microphone array. This ultimately help to mitigate false positives produced by noise or echos.

The maximum delta among all of the computed deltas is then determined by comparing all of the deltas to each other. Here to, an additional robustness threshold may be applied where the maximum delta must be greater than the other deltas by at least a threshold such as 50, for any AoA to be output. In this way, the differences or deltas in frequency that indicate specific AoA directions are much more likely to be the result of the AoA rather than noise in noisy situations so that the detected AoA direction estimations are much more likely to be accurate. Again, the threshold may be determined by experimentation.

Process 300 next may include "determine angle of arrival depending on a rotational orientation of the semicircle with the maximum frequency-related value" 314, and more precisely by the current example, the maximum frequency-related value between the two frequency-related values of the opposing semicircles of microphones with the maximum delta. It will be understood that this maximum frequency-related value is either a total of differences of virtual and center sample frequency counts for a semicircle of the microphones, or alternatively the maximum frequency-related value is a total of the frequency count of the virtual microphones of a semicircle of the microphones.

In either example, and as described above, the maximum frequency-related value of two opposing values is on a specific side (left or right) of the AoA depending on the rotational direction of the sampling on the circular array. Thus, in this example, when the sampling is performed in a clockwise manner, the maximum frequency-related value, or approaching side, will be on the right side of the potential AoA direction with the maximum delta when facing in the direction or heading of the AoA. Thus, for example, while referring to FIG. 1, when the semicircle with microphones {5, 0, 1} has a maximum delta with opposing semicircle microphones {2, 3, 4}, and the semicircle with microphones {5, 0, 1} have a larger frequency-related value than that of the semicircle of microphones {2, 3, 4}, then the acoustic AoA is 180 (or −180) degrees.

Note that by one form, yet another robustness threshold may be provided and an AoA is not output unless the maximum frequency-related value is above the threshold, which is set at 250 by one possible example and is determined by experimentation. This threshold is used to select high frequency signals in which the estimation of the angle is more accurate to avoid false positives. This threshold, however, can be significantly relaxed by reducing the threshold to estimate the AoA based on low frequencies as well.

It will be understood that while a discrete AoA may be determined for each complete cycle as described above for FIGS. 3-5, a final AoA could be a determination over a number of cycles such as an average AoA position and heading, or most occurring AoA position and heading, and so forth.

Thereafter, a value indicating the AoA, whether the value of the angle itself or some other representation, such as a binary representation or flag on an overhead of the audio data, depending on what is expected, may be provided to transmission applications, such as a beamformer application, and otherwise to end applications, such as automatic speech recognition (ASR) or speaker recognition (SR) applications for example. With such guided beamforming, the ASR and SR quality will be improved with a reduction in computational load, which permits reduction in memory capacity requirements, power consumption, and hardware foot print, thereby contributing to easing of small device parameter restrictions.

An example C++ pseudo code is provided below to show an example implementation as follows. The term channel[ ] refers to samples of the center microphone, buffer[ ] refers to samples of the virtual or array microphones, ref[ ] refers to the center or reference microphone frequency counter, and dopple[ ] refers to the virtual or array microphone frequency counter. Otherwise, the correspondence between operations in the code below and operations described above can be determined by the context.

```
void ProcessAudioDoppler( )
{
        int i, ini_idx;
        float TempAng;
        if (busy)return;
        busy = true;
        PaError err = paNoError;
        unsigned int NumberofElements = BLOCK_LEN * sizeof(float);
    //Sampling the central mic0 and the virtual mic
        int j = 0;
        int Section=BLOCK_LEN / 6;
        int s = 0;
        for (i = 0; i < (BLOCK_LEN - 1) * 8; i += 8) {
                Channe10[j] = data · recordedSamples[i];
                int idx = j % 6;
                Buffer 1 [j] = data · recordedSamples[i + 1 + idx];
                j++;
        }
        dataAvailable = false;
  //Background noise is ignored, only process when a sound is produced
     if (is_block_active(Channe10, BLOCK_LEN, 0.5))
     {
        int Ref[6] = { 0 };
        int Doppler[6] = { 0 };
        for (i = 0; i < (BLOCK_LEN − 1); i++)
        {
                int s = i%6;
                if((Channel0[i]>0&&Channel0[i + 1]<0) || (Channel0[i]<0&&Channel0[i + 1]>0))Ref
[s]++;
                if (Bufferl [i]>0&&Bufferl [i + 1] <0 || Buffer1[i]<0&&Bufferl [i + 1] >
0) Doppler[s]++;
        }
        for (int i = 0; i < 6; i++) { Doppler[i] −= Ref[i]; }
        //by group of 3
        int Delta[6];
        Delta[0] = abs((Doppler[0] + Doppler[1]+ Doppler[5]) − (Doppler[2] +
        Doppler[3] + Doppler[4]));//this is for 0 or −180/180
        Delta[1] = abs((Doppler[0] + Doppler[4] + Doppler[5]) − (Doppler[2] +
        Doppler[3] + Doppler[1]));//this is for 60 or −120
        Delta[2] = abs((Doppler[3] + Doppler[4] + Doppler[5]) − (Doppler[0] +
        Doppler[1] + Doppler[2]));//120 or −60
        int idxl = −1;
        int idx2 = 0;
        if (Delta[0] > 100 || Delta[1] > 100 || Delta[2] > 100)
        {
                if (Delta[0] - MAX(Delta[1], Delta[2]) > 50)
                {
                idxl = ((Doppler[0] + Doppler[1] + Doppler[5]) > (Doppler[2] +
                Doppler[3] + Doppler[4])) ? 0:3;
```

-continued

```
            }
            if (Delta[1] - MAX(Delta[0] , Delta[2]) > 50)
            {
            idxl = ((Doppler[0] + Doppler[4] + Doppler[5]) > (Doppler[2] +
            Doppler[3] + Doppler[1])) ? 5:2;
            }
            if (Delta[2] − MAX(Delta[1], Delta[0]) > 50)
            {
            idxl = ((Doppler[3] + Doppler[4] +Doppler[5]) > (Doppler[0] +
            Doppler[1] +Doppler[2])) ? 4:1;
            }
            if (idxl >= 0)
            {
              int angle = 1;
              if (idxl == 0&& (Doppler[0] + Doppler[1] + Doppler[5])>250)
              {angle = -178;}
              if (idxl == 1&& (Doppler[0] + Doppler[1] + Doppler[2])>250)
              { angle = 120; }
              if (idxl == 2&& (Doppler[2] + Doppler[3] + Doppler[1])>250)
              {angle = 60; }
              if (idxl == 3&& (Doppler[2]+ Doppler[3] + Doppler[4])>250)
              {angle = 0;}
              if (idxl == 4&& (Doppler[3] + Doppler[4] + Doppler[5])>250)
              {angle = −60; }
              if (idxl == 5&& (Doppler[0] + Doppler[4] + Doppler[5])>250)
              {angle = −120; }
              if (angle != 1)
              {
                printf("winner=%d,Angle=%d\n", idx l, angle);
              }
            }
          }
        }
        busy = false;
}
```

Alternatively, when multiplication to detect a zero crossing and perform frequency counting is permitted, the zero crossing may be determined by the following code instead.

```
if (Channel0[i]*Channel0[i+1]<0)Ref[s]++;
if (Buffer1[i]*Buffer1[i+1]<0)Doppler[s]++;
```

Figure 6:
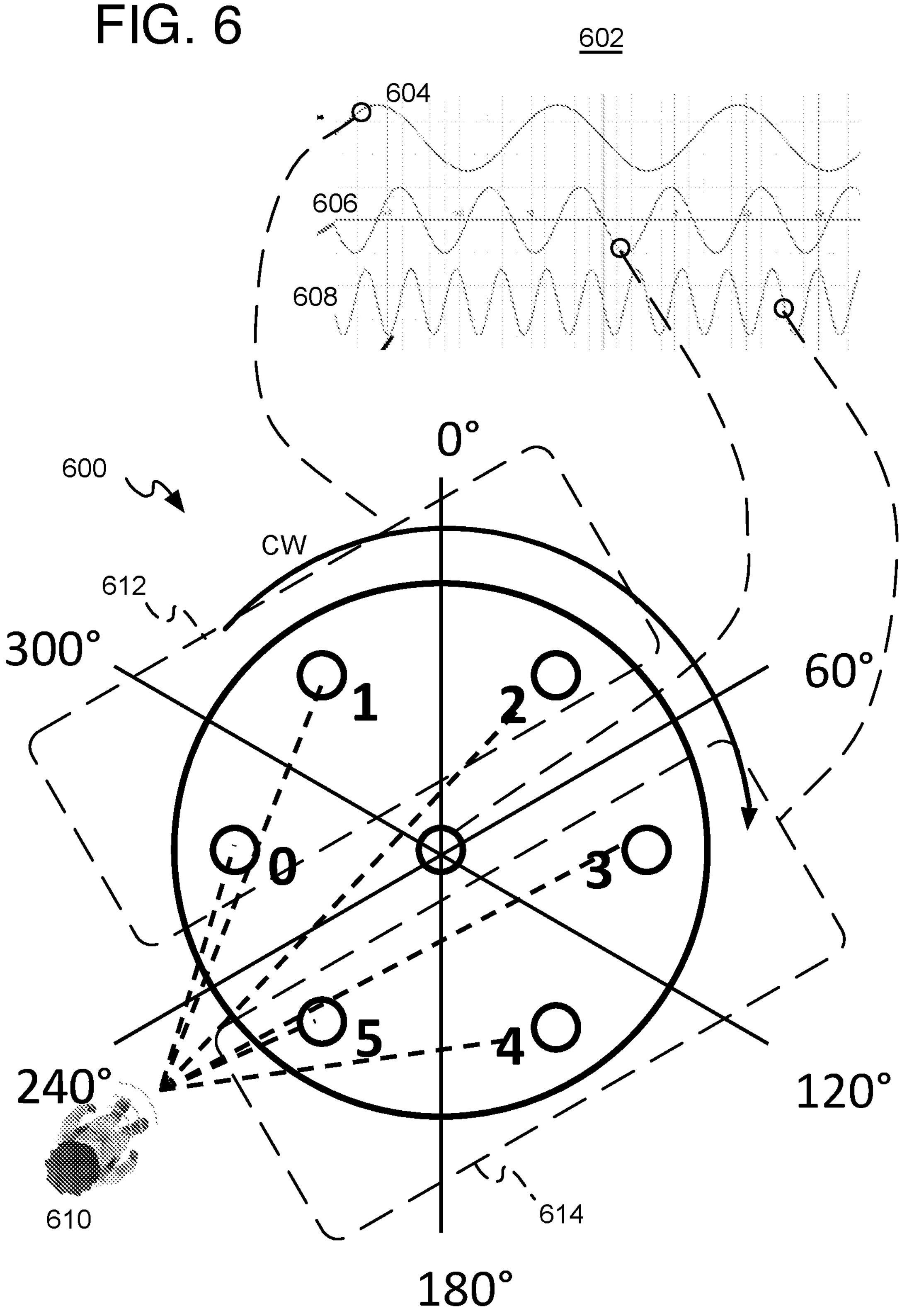
FIG. 6 is a schematic diagram of an acoustic angle of arrival detection setup shown in operation and according to at least one of the implementations described herein.
Figure 7:
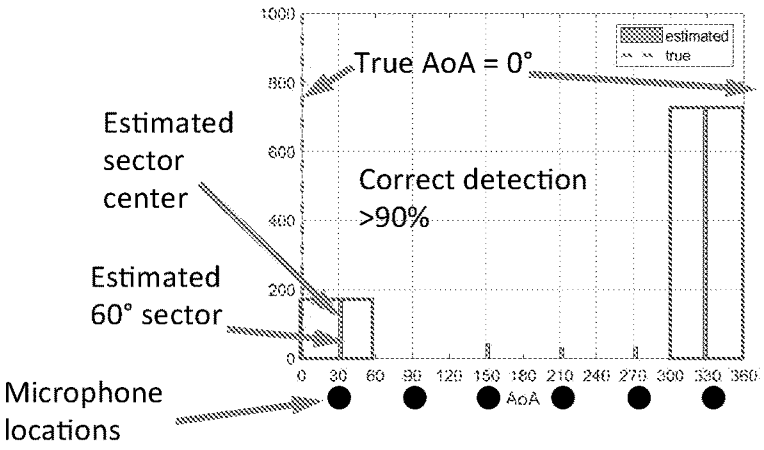
FIG. 7 is a graph of true and estimated audio arrival angle sector obtained by using at least one of the implementations described herein.
Figure 8:
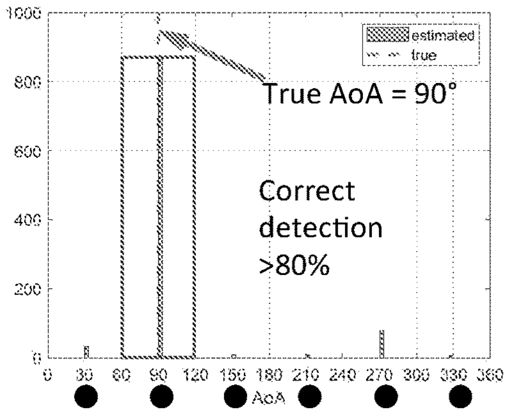
FIG. 8 is another graph of true and estimated audio arrival angle sector obtained by using at least one of the implementations described herein.
Figure 9:
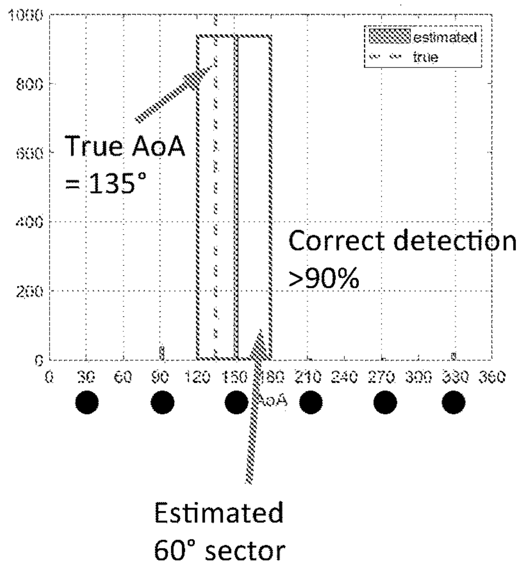
FIG. 9 is yet another graph of true and estimated audio arrival angle sector obtained by using at least one of the implementations described herein.
Figure 10:
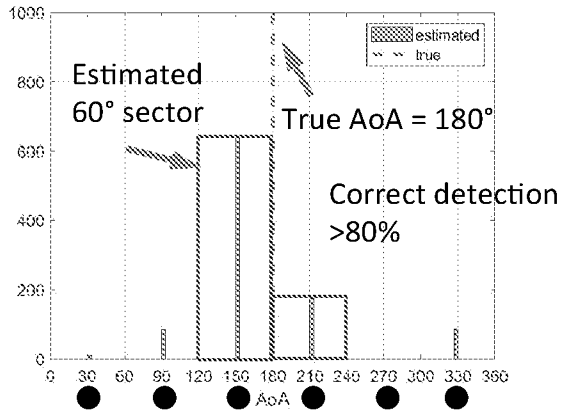
FIG. 10 is a further graph of true and estimated audio arrival angle sector obtained by using at least one of the implementations described herein.
Figure 11:
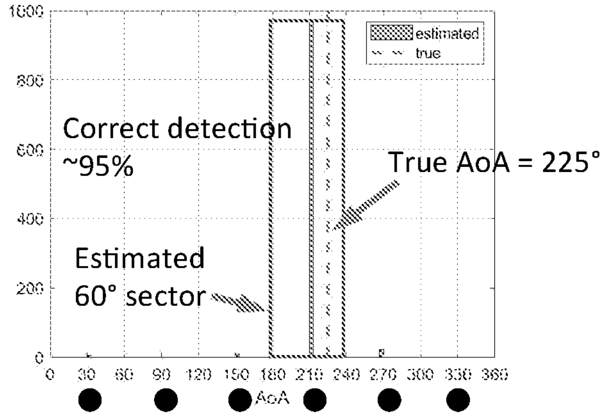
FIG. 11 is yet a further graph of true and estimated audio arrival angle sector obtained by using at least one of the implementations described herein.

Referring now to FIG. 6, audio signal samples from a circular array 600 of microphones 0 to 5 were used to test the AoA detection system, device, and methods described herein by applying processes 300, 400, and 500 described above. To show the feasibility of the disclosed method, a series of about 1 minute voice recordings were performed at 5 different angles relative to a UMA-8 circular array device, and as shown in FIG. 6. For each recording, a series of 1000 voice segments of 0.5 s duration each were taken randomly (offline for simplicity). The testing setup exemplifies the process, and shows the audio source (or person here) 610 being located at the 240 degree (or −120 degree) position so that the potential AoA direction (or line) has the 60 and 240 degree specific headings. The semicircles or opposing sides 612 and 614 of the AoA direction each have three microphones {3, 4, 5} and {0, 1, 2} sampled in clockwise order according to arrow CW.

When virtually passing over microphone locations 0-2 in a clockwise sequence, the VRM signal will show a decreasing audio frequency relative to the central microphone because it is "moving away" from the speaker. In contrast, when passing over microphones 3-5, the audio frequency increases because it is approaching the speaker. As shown by graph 602, the approaching side 614 has the greatest total frequency, while the moving away or diverging side 612 has the lowest total frequency. The center microphone has a frequency between the two.

Referring to FIGS. 7-11, the results show that the disclosed method correctly estimates the AoA with 60° accuracy as expected with a resolution of six microphones. Each graph 700, 800, 900, 1000, and 1100 shows a histogram of the estimated AoA. Note that the true AoA (shown in dashed line) falls within the predicted 60° more than 80% of the time. Also note that even for ambiguous directions like 0° and 180°, detection is still correct greater than 80% of the time.

It will be appreciated that processes 200, 300, 400, and/or 500 may be provided by sample audio processing system 1400 to operate at least some implementations of the present disclosure. In addition, any one or more of the operations of the processes of FIGS. 2-5 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 12:
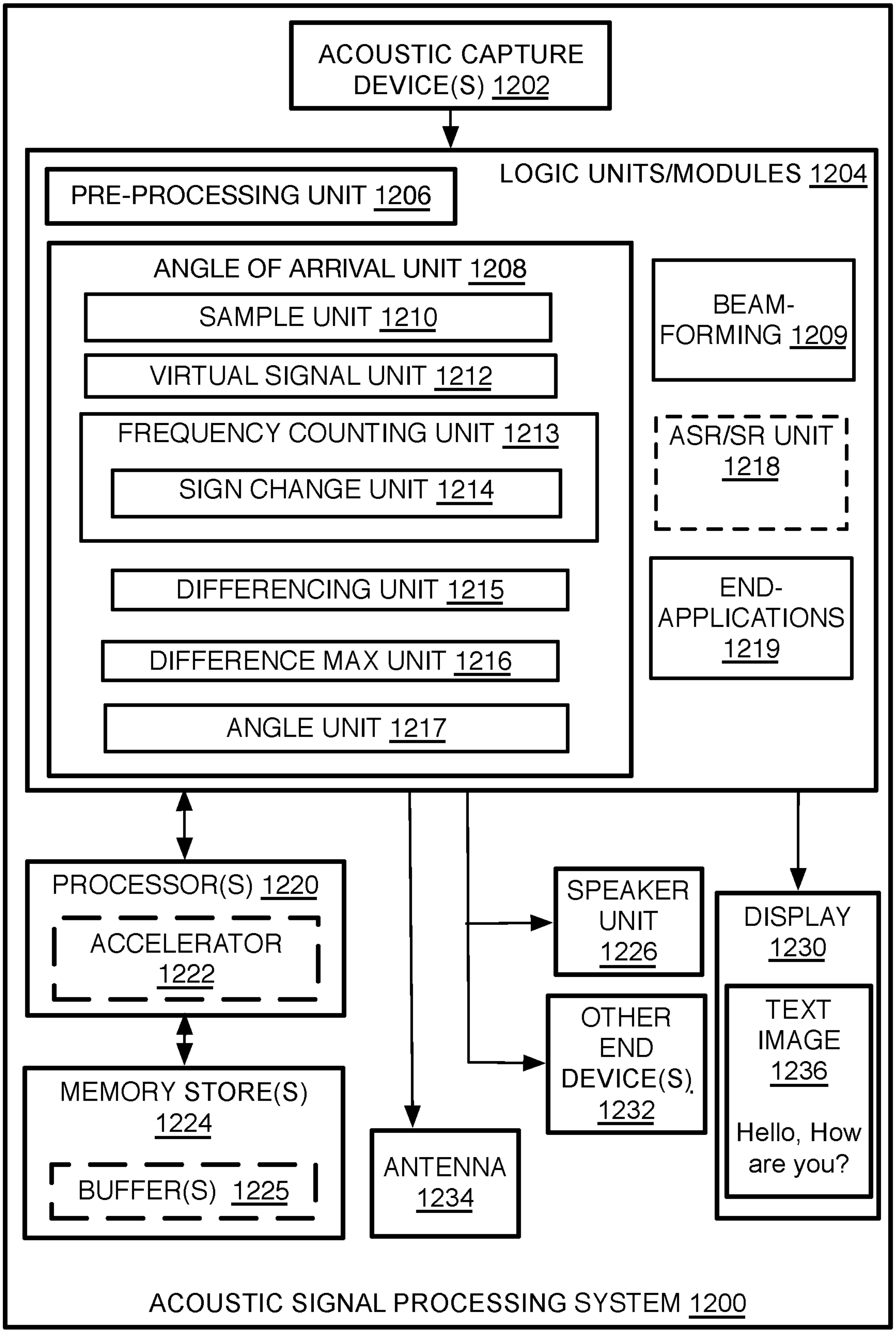
FIG. 12 is an illustrative diagram of an example system.

Referring to FIG. 12, an example acoustic signal processing system 1200 is arranged in accordance with at least some implementations of the present disclosure. In various implementations, the example acoustic signal processing system 1200 may have an acoustic capture device(s) 1202 to form or receive acoustical signal data. This can be implemented in various ways. Thus, in one form, the acoustic signal processing system 1200 is a device, or is on a device, with one or more microphones. In other examples, the acoustic signal processing system 1200 may be in communication with one or an array or network of microphones, and may be remote from these acoustic signal capture devices such that logic modules 1204 may communicate remotely with, or otherwise may be communicatively coupled to, the microphones for further processing of the acoustic data.

In either case, such technology may include a smart phone, smart speaker, a tablet, laptop or other computer, dictation machine, other sound recording machine, a mobile device or an on-board device, or any combination of these. Thus, in one form, audio capture device 1202 may include audio capture hardware including one or more sensors as well as actuator controls. These controls may be part of a sensor module or component for operating the sensor. The sensor component may be part of the audio capture device 1202, or may be part of the logical modules 1204 or both. Such sensor component can be used to convert sound waves into an electrical acoustic signal. The audio capture device 1202 also may have an A/D converter, other filters, and so forth to provide a digital signal for acoustic signal processing.

In the illustrated example, the logic modules 1204 may include a pre-processing unit 1206 that may have an analog to digital convertor, and may perform pre-processing of raw audio signals sufficient for the AoA operations herein. The logic modules 1204 also may have an angle of arrival (AoA) unit 1208 that performs the functions mentioned above. To perform the functions mentioned above, the AoA unit 1208 may have a sample unit 1210 that retrieves the sequential samples, a virtual signal unit 1212 that generates the virtual signal, a frequency counting unit 1213 that may use a sign change unit 1214 to count zero crossings, and in turn signal frequency at each sample, a differencing unit 1215 that finds the semicircle frequency differences, a difference max unit 1216 that finds that semicircle with maximum frequency count, and an angle unit 1217 that determines the AoA depending on the position of the maximum semicircle on the circular array.

Other modules that use the AoA may include a beam-forming unit 1209, an ASR/VR unit 1218 that may be provided for speech or voice recognition when desired, and other end applications 1219 that may be provided to use the AoA and audio signals received by the acoustic capture device 1202. The logic modules 1204 also may include other end devices 1232 such as a coder to encode the output signals for transmission or decode input signals when audio is received via transmission. These units may be used to perform the operations described above where relevant.

The acoustic signal processing system 1200 may have one or more processors 1220 which may include one or more central processing units and a dedicated accelerator 1222 such as the Intel Atom, memory stores 1224 with one or more buffers 1225 to hold audio-related data such as delayed samples described above, at least one speaker unit 1226 to emit audio based on the input acoustic signals when desired, one or more displays 1230 to provide images 1236 of text for example, as a visual response to the acoustic signals. The other end device(s) 1232 also may perform actions in response to the acoustic signal. In one example implementation, the acoustic signal processing system 1200 may have the at least one processor 1220 communicatively coupled to the acoustic capture device(s) 1202 (such as at least two microphones or more to form a circular array of microphones) and at least one memory 1224. An antenna 1234 may be provided to transmit data or relevant commands to other devices that may use the AoA output, or may receive audio for into for AoA detection. The antenna 1234 may be steerable for beam-forming for example. As illustrated, any of these components may be capable of communication with one another and/or communication with portions of logic modules 1204 and/or audio capture device 1202. Thus, processors 1220 may be communicatively coupled to the audio capture device 1202, the logic modules 1204, and the memory 1224 for operating those components.

Figure 13:
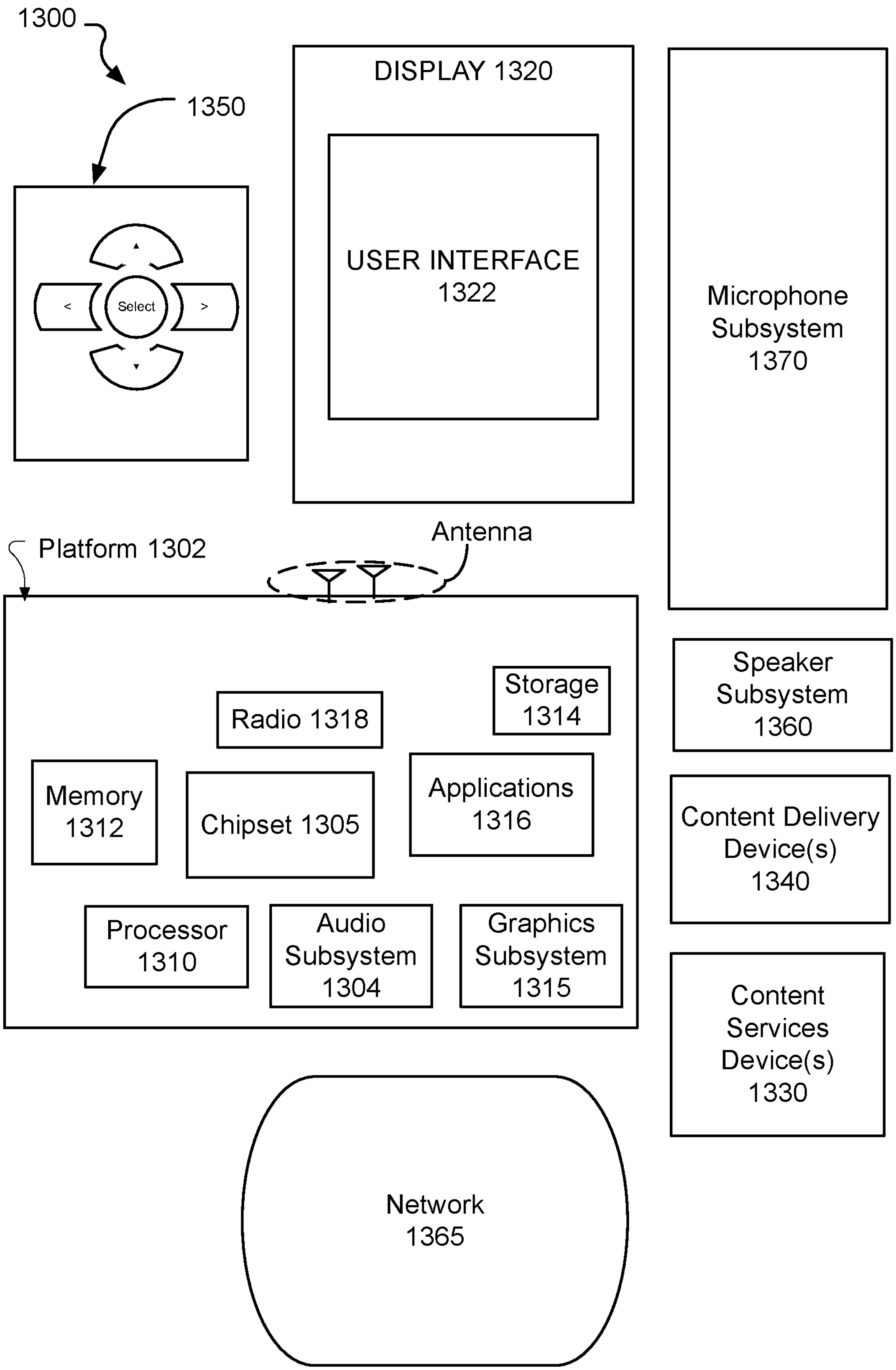
FIG. 13 is an illustrative diagram of another example system.

While typically the label of the units or blocks on device 1200 indicates which functions are performed by that unit and which operations a unit performs of any of the processes described herein, a unit may perform different functions or mix of functions than that suggested by the unit label. Also, although acoustic signal processing system 1200, as shown in FIG. 12, may include one particular set of blocks or actions associated with particular components or modules, these blocks or actions may be associated with different components or modules than the particular component or module illustrated here, Referring to FIG. 13, an example system 1300 in accordance with the present disclosure operates one or more aspects of the speech processing system described herein. It will be understood from the nature of the system components described below that such components may be associated with, or used to operate, certain part or parts of the speech processing system described above. In various implementations, system 1300 may be a media system although system 1300 is not limited to this context. For example, system 1300 may be incorporated into multiple microphones of a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having a network of acoustic signal producing devices.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302, speaker subsystem 1360, microphone subsystem 1370, and/or display 1320. Each of these components is described in greater detail below.

In various implementations, platform 1302 may include any combination of a chipset 1305, processor 1310, memory 1312, storage 1314, audio subsystem 1304, graphics subsystem 1315, applications 1316 and/or radio 1318. Chipset 1305 may provide intercommunication among processor 1310, memory 1312, storage 1314, audio subsystem 1304, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Audio subsystem 1304 may perform processing of audio such as acoustic signals for one or more audio-based applications such as speech recognition, speaker recognition, and so forth. The audio subsystem 1304 may comprise one or more processing units, memories, and accelerators. Such an audio subsystem may be integrated into processor 1310 or chipset 1305. In some implementations, the audio subsystem 1304 may be a stand-alone card communicatively coupled to chipset 1305. An interface may be used to communicatively couple the audio subsystem 1304 to a speaker subsystem 1360, microphone subsystem 1370, and/or display 1320.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320, speaker subsystem 1360, and microphone subsystem 1370. Platform 1302 and/or content services device(s) 1330 may be coupled to a network 1365 to communicate (e.g., send and/or receive) media information to and from network 1365. Content delivery device(s) 1340 also may be coupled to platform 1302, speaker subsystem 1360, microphone subsystem 1370, and/or to display 1320.

In various implementations, content services device(s) 1330 may include a network of microphones, a cable television box, personal computer, network, telephone, Internet enabled devices or appliance capable of delivering digital information and/or content, and any other similar device capable of unidirectionally or bidirectionally communicating content between content providers and platform 1302 and speaker subsystem 1360, microphone subsystem 1370, and/or display 1320, via network 1365 or directly. It will be appreciated that the content may be communicated unidirectionally and/or bidirectionally to and from any one of the components in system 1300 and a content provider via network 1365. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1304 also may be used to control the motion of articles or selection of commands on the interface 1322.

Movements of the navigation features of controller 1350 may be replicated on a display (e.g., display 1320) by movements of a pointer, cursor, focus ring, or other visual indicators displayed on the display or by audio commands. For example, under the control of software applications 1316, the navigation features located on navigation controller 1350 may be mapped to virtual navigation features displayed on user interface 1322, for example. In embodiments, controller 1350 may not be a separate component but may be integrated into platform 1302, speaker subsystem 1360, microphone subsystem 1370, and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example, or by auditory command. Program logic may allow platform 1302 to stream content to media adaptors or other content services device(s) 1330 or content delivery device(s) 1340 even when the platform is turned "off." In addition, chipset 1305 may include hardware and/or software support for 8.1 surround sound audio and/or high definition (7.1) surround sound audio, for example. Drivers may include an auditory or graphics driver for integrated auditory or graphics platforms. In embodiments, the auditory or graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302, speaker subsystem 1360, microphone subsystem 1370, and/or display 1320 may be an integrated unit. Display 1320, speaker subsystem 1360, and/or microphone subsystem 1370 and content service device(s) 1330 may be integrated, or display 1320, speaker subsystem 1360, and/or microphone subsystem 1370 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
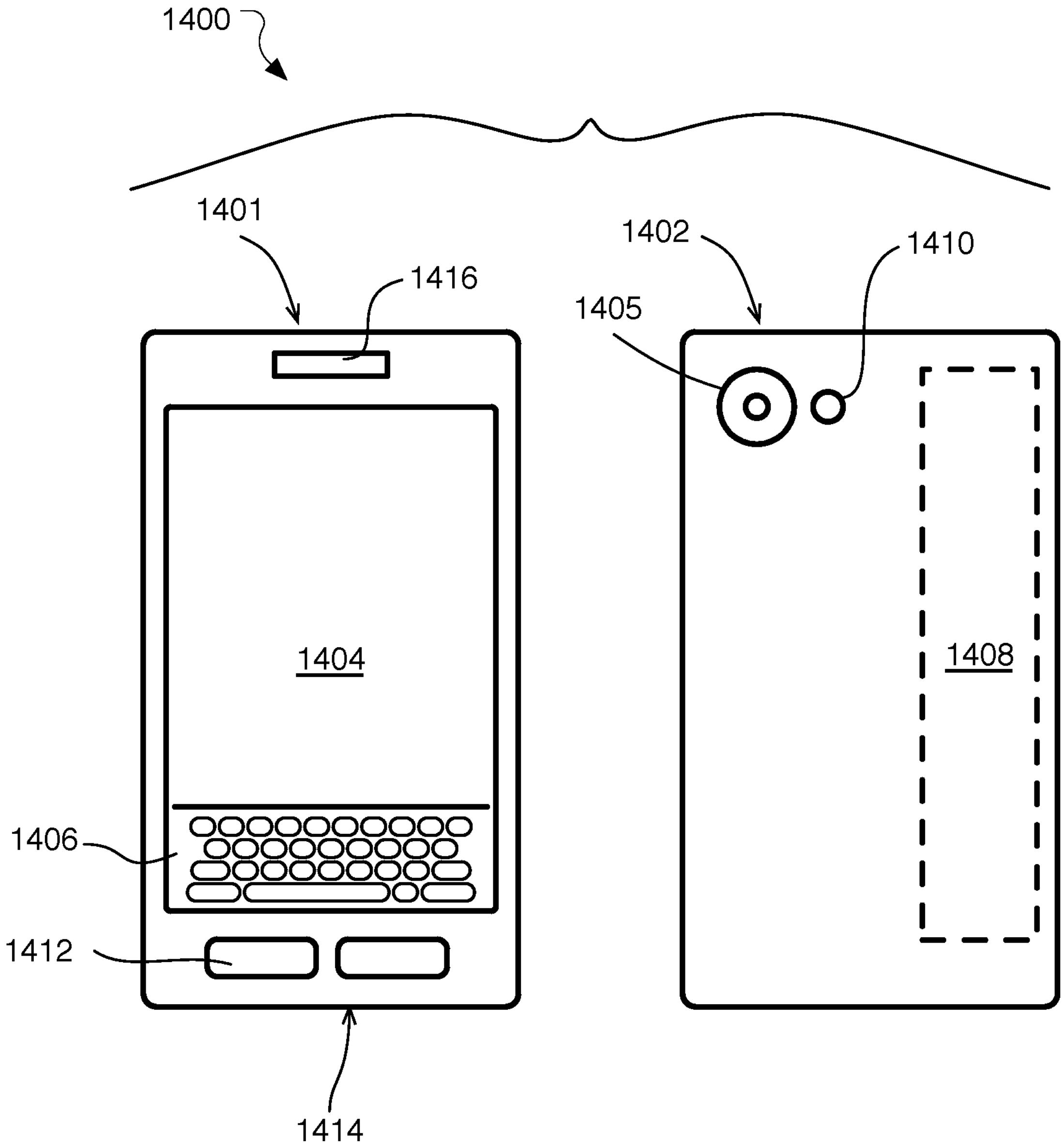
FIG. 14 illustrates another example device, all arranged in accordance with at least some implementations of the present disclosure.

Referring to FIG. 14, a small form factor device 1400 is one example of the varying physical styles or form factors in which systems 1200 or 1300 may be embodied. By this approach, device 1400 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, microphone system or network, and so forth, and any other on-board (such as on a vehicle), or building, computer that may accept audio commands.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers 1416, voice recognition device and software, and so forth. Information also may be entered into device 1400 by way of microphones 1414 of a microphone array. As shown, device 1400 may include a camera 1405 (e.g., including a lens, an aperture, and an imaging sensor) and a flash 1410 integrated into back 1402 (or elsewhere) of device 1400.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), fixed function hardware, field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of acoustic angle of arrival detection comprising: receiving audio signals from a fixed circular array of microphones and based on audio received by the circular array; and determining an acoustic angle of arrival of the audio relative to the circular array comprising generating at least two frequency-related values each associated with microphones on an opposite side of a potential angle of arrival direction, and comparing the frequency-related values, wherein the generating comprises using signs of the audio signals without using magnitudes of the audio signals in computations to generate and compare the frequency-related values.

By one or more example second implementation, and further to the first implementation, wherein the method comprising sampling the audio signals of the microphones in an order that results in imitating sampling of an audio signal of a single moving microphone.

By one or more example third implementations, and further to the first implementation, wherein the method comprising sequentially sampling microphones in a circular order around the array of microphones while obtaining only a single sample of one microphone at each sample time frame to provide a virtual signal of a virtual moving microphone.

By one or more example fourth implementations, and further to any of the first to third implementation, wherein the frequency-related values are related to frequency counts.

By one or more example fifth implementations, and further to any of the first to fourth implementation, wherein the method comprising determining a first frequency count for the samples comprising counting sign changes of samples of the audio signals and from one microphone of the circular array to another.

By one or more example sixth implementations, and further to the fifth implementation, wherein the method comprising combining the first frequency counts of microphones on one side of the potential direction to form the individual frequency-related values, and repeating the combining for multiple different potential directions.

By one or more example seventh implementations, and further to the fifth implementation, wherein the method comprising determining a second frequency count comprising counting sign changes of a center microphone amid the circular array of microphones, and combining the differences of the first and second counts at a same time point to generate the frequency-related values.

By one or more example eighth implementations, and further to any of the first to seventh implementation, wherein the determining comprises using a change in frequency of samples of the audio signal and from microphone to microphone due to a doppler effect.

By one or more example ninth implementations, and further to any of the first to eighth implementation, wherein samples of the audio signal from a semicircle of microphones are used to form each frequency-related value.

By one or more example tenth implementations, and further to the ninth implementation, wherein two opposite frequency-related values are formed for each available potential angle of array direction at the circular array.

By one or more example eleventh implementations, and further to any of the first to ninth implementation, wherein the method comprising determining which frequency-related value is a maximum frequency-related value in a set of two frequency-related values on opposite sides of a potential direction and with a maximum difference between the two frequency-related values in the set among all sets of all available potential directions, and setting the angle of arrival depending on an orientation of a semicircle associated with the microphones of the circular array used to form the maximum frequency-related value.

By one or more example twelfth implementations, a computer-implemented system of acoustic angle of arrival detection comprises memory storing samples of audio signals received from a circular array of fixed microphones and based on audio received by the circular array; and processor circuitry forming at least one processor communicatively connected to the memory, the at least one processor being arranged to operate by: determining an acoustic angle of arrival of the audio relative to the circular array comprising generating at least two frequency-related values each associated with microphones on an opposite side of a potential angle of arrival direction, and comparing the frequency related values, wherein the generating and comparing comprises using signs of the audio signals without using magnitudes of the audio signals in computations to generate and compare the frequency-related values.

By one or more example thirteenth implementations, and further to the twelfth implementation, wherein with the frequency-related values are each sums related to frequency counts of samples of microphones on one side of a potential direction.

By one or more example fourteenth implementations, and further to the twelfth implementation, wherein the at least one processor is arranged to operate by determining the difference between the two frequency-related values, and wherein a difference between two opposite frequency-related values is determined with multiple different available potential directions.

By one or more example fifteenth implementations, and further to the fourteenth implementation, wherein the at least one processor is arranged to operate by determining a maximum difference among the two opposite frequency-related value differences.

By one or more example sixteenth implementations, and the fifteenth implementation, wherein the at least one processor is arranged to operate by determining a maximum frequency-related value between the two frequency-related values with the maximum difference.

By one or more example seventeenth implementations, and the sixteenth implementation, wherein the at least one processor is arranged to operate by setting the angle of arrival depending on which side of the potential direction the maximum frequency-related value is associated with and the rotational direction in which samples of the audio signal are obtained around the circular array.

By one or more example eighteenth implementations, and further to any of the twelfth to seventeenth implementation, wherein the number of available potential directions and number of different microphone combinations used to form the frequency-related values depends on the number of microphones in the circular array.

By one or more example nineteenth implementations, at least one non-transitory computer readable medium comprising a plurality of instructions that in response to being executed on a computing device, causes the computing device to operate by: receiving audio signals from a fixed circular array of microphones and based on audio received by the circular array; and determining an acoustic angle of arrival of the audio relative to the circular array comprising generating at least two frequency-related values each associated with microphones on an opposite side of a potential angle of arrival direction, and comparing the frequency-related values, wherein the generating comprises using signs of the audio signals without using magnitudes of the audio signals in computations to generate and compare the frequency-related values.

By one or more example twentieth implementations, and further to the nineteenth implementation, wherein the determining comprises obtaining samples of the audio signals in an order from the microphones of the circular array to imitate samples of an audio signal from a single rotating microphone, and wherein the frequency-related values are sums related to frequency counts of samples of microphones on one side of the potential direction and obtained for multiple different potential directions.

By one or more example twenty-first implementations, and further to the nineteenth or twentieth implementation, wherein the instructions cause the computing device to operate by determining which frequency-related value is a maximum frequency-related value in a set of two frequency-related values on opposite sides of a potential direction and with a maximum difference between the two frequency-related values among sets of all available potential directions, and setting the angle of arrival depending on an orientation of a semicircle associated with the microphones of the circular array used to form the maximum frequency-related value.

By one or more example twenty-second implementations, and further to any of the nineteenth to twenty-first implementation, wherein at least one of: (1) the frequency-related value, (2) a difference between frequency-related values on opposite sides of a potential direction, and (3) a maximum difference among differences between frequency-related values on opposite sides of a potential direction, is compared to a threshold to determine whether or not a frequency-related value is to be used to determine the angle of arrival.

By one or more example twenty-third implementations, and further to any of the nineteenth to twenty-second implementation, wherein the acoustic angle of arrival is determined without using multiplication and bit shifts.

By one or more example twenty-fourth implementations, and further to any of the nineteenth to twenty-third implementation, wherein the acoustic angle of arrival is determined without converting audio values into the frequency domain.

By one or more example twenty-fifth implementations, and further to any of the nineteenth to twenty-fourth implementation, wherein the acoustic angle of arrival is determined without the use of a fixed function digital signal processor (DSP).

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of acoustic angle of arrival detection comprising:

receiving audio signals from a circular array of fixed microphones; and determining an acoustic angle of arrival of the audio relative to the circular array comprising generating at least two frequency-related values each associated with microphones on an opposite side of a potential angle of arrival direction, and comparing the frequency-related values, wherein the generating comprises using signs of the audio signals without using magnitudes of the audio signals in computations to generate and compare the frequency-related values.

2. The method of claim 1 comprising sampling the audio signals of the microphones in an order that results in imitating sampling of an audio signal of a single moving microphone.

3. The method of claim 1 comprising sequentially sampling microphones in a circular order around the array of microphones while obtaining only a single sample of one microphone at each sample time frame to provide a virtual signal of a virtual moving microphone.

4. The method of claim 1 wherein the frequency-related values are related to frequency counts.

5. The method of claim 1 comprising determining a first frequency count for the samples comprising counting sign changes of samples of the audio signals and from one microphone of the circular array to another.

6. The method of claim 5 comprising combining the first frequency counts of microphones on one side of the potential direction to form the individual frequency-related values, and repeating the combining for multiple different potential directions.

7. The method of claim 5 comprising determining a second frequency count comprising counting sign changes of a center microphone amid the circular array of microphones, and combining the differences of the first and second counts at a same time point to generate the frequency-related values.

8. The method of claim 1 wherein the determining comprises using a change in frequency of samples of the audio signal and from microphone to microphone due to a doppler effect.

9. The method of claim 1 wherein samples of the audio signal from a semicircle of microphones are used to form each frequency-related value.

10. The method of claim 9 wherein two opposite frequency-related values are formed for each available potential angle of array direction at the circular array.

11. The method of claim 1 comprising determining which frequency-related value is a maximum frequency-related value in a set of two frequency-related values on opposite sides of a potential direction and with a maximum difference between the two frequency-related values in the set among all sets of all available potential directions, and setting the angle of arrival depending on an orientation of a semicircle associated with the microphones of the circular array used to form the maximum frequency-related value.

12. A computer-implemented system of acoustic angle of arrival detection, comprising:

memory storing samples of audio signals received from a circular array of fixed microphones; and processor circuitry forming at least one processor communicatively connected to the memory, the at least one processor being arranged to operate by:

determining an acoustic angle of arrival of the audio relative to the circular array comprising generating at least two frequency-related values each associated with microphones on an opposite side of a potential angle of arrival direction, and comparing the frequency related values, wherein the generating and comparing comprises using signs of the audio signals without using magnitudes of the audio signals in computations to generate and compare the frequency-related values.

13. The system of claim 12 wherein with the frequency-related values are each sums related to frequency counts of samples of microphones on one side of a potential direction.

14. The system of claim 12 wherein the at least one processor is arranged to operate by determining the difference between the two frequency-related values, and wherein a difference between two opposite frequency-related values is determined with multiple different available potential directions.

15. The system of claim 14 wherein the at least one processor is arranged to operate by determining a maximum difference among the two opposite frequency-related value differences.

16. The system of claim 15 wherein the at least one processor is arranged to operate by determining a maximum frequency-related value between the two frequency-related values with the maximum difference.

17. The system of claim 16 wherein the at least one processor is arranged to operate by setting the angle of arrival depending on which side of the potential direction the maximum frequency-related value is associated with and the rotational direction in which samples of the audio signal are obtained around the circular array.

18. The system of claim 12 wherein the number of available potential directions and number of different microphone combinations used to form the frequency-related values depends on the number of microphones in the circular array.

19. At least one non-transitory computer readable medium comprising a plurality of instructions that in response to being executed on a computing device, causes the computing device to operate by:

receiving audio signals from a circular array of fixed microphones; and determining an acoustic angle of arrival of the audio relative to the circular array comprising generating at least two frequency-related values each associated with microphones on an opposite side of a potential angle of arrival direction, and comparing the frequency-related values, wherein the generating comprises using signs of the audio signals without using magnitudes of the audio signals in computations to generate and compare the frequency-related values.

20. The medium of claim 19 wherein the determining comprises obtaining samples of the audio signals in an order from the microphones of the circular array to imitate samples of an audio signal from a single rotating microphone, and wherein the frequency-related values are sums related to frequency counts of samples of microphones on one side of the potential direction and obtained for multiple different potential directions.

21. The medium of claim 19 wherein the instructions cause the computing device to operate by determining which frequency-related value is a maximum frequency-related value in a set of two frequency-related values on opposite sides of a potential direction and with a maximum difference between the two frequency-related values among sets of all available potential directions, and setting the angle of arrival depending on an orientation of a semicircle associated with the microphones of the circular array used to form the maximum frequency-related value.

22. The medium of claim 19 wherein at least one of:

(1) the frequency-related value, (2) a difference between frequency-related values on opposite sides of a potential direction, and (3) a maximum difference among differences between frequency-related values on opposite sides of a potential direction, is compared to a threshold to determine whether or not a frequency-related value is to be used to determine the angle of arrival.

23. The medium of claim 19 wherein the acoustic angle of arrival is determined without using multiplication and bit shifts.

24. The medium of claim 19 wherein the acoustic angle of arrival is determined without converting audio values into the frequency domain.

25. The medium of claim 19 wherein the acoustic angle of arrival is determined without the use of a fixed function digital signal processor (DSP).

* * * * *